US012528021B2

(12) United States Patent
Bailey

(10) Patent No.: US 12,528,021 B2
(45) Date of Patent: Jan. 20, 2026

(54) SYSTEM AND METHOD FOR FACILITATING VIRTUAL PARTICIPATION IN A RACING EVENT

(71) Applicant: SAGE ENTERTAINMENT PTY LTD, Piccaddilly (AU)

(72) Inventor: Grant Bailey, Piccadilly (AU)

(73) Assignee: SAGE ENTERTAINMENT PTY LTD, Western (AU)

( * ) Notice: Subject to any disclaimer, the term of this patent is extended or adjusted under 35 U.S.C. 154(b) by 162 days.

(21) Appl. No.: 18/559,813

(22) PCT Filed: May 12, 2022

(86) PCT No.: PCT/AU2022/050449
§ 371 (c)(1),
(2) Date: Nov. 9, 2023

(87) PCT Pub. No.: WO2022/236372
PCT Pub. Date: Nov. 17, 2022

(65) Prior Publication Data
US 2024/0269572 A1    Aug. 15, 2024

(30) Foreign Application Priority Data

May 12, 2021    (AU) ................................ 2021901407

(51) Int. Cl.
*A63F 13/803*    (2014.01)
*A63F 13/55*    (2014.01)
(Continued)

(52) U.S. Cl.
CPC ............ *A63F 13/803* (2014.09); *A63F 13/55* (2014.09); *A63F 13/65* (2014.09); *G06T 19/003* (2013.01); *G06T 19/006* (2013.01)

(58) Field of Classification Search
CPC ........ A63F 13/803; A63F 13/55; A63F 13/65; A63F 13/35; A63F 2300/8082;
(Continued)

(56) References Cited

U.S. PATENT DOCUMENTS 6,080,063 A * 6/2000 Khosla .................... A63F 13/45
463/42
8,436,903 B2    5/2013 Frederick
(Continued)

OTHER PUBLICATIONS

Extended European Search Report dated Jul. 21, 2025 for corresponding European Application No. 22801002.1.
(Continued)

*Primary Examiner* — Thomas H Henry
(74) *Attorney, Agent, or Firm* — Chrisman Gallo Tochtrop LLC

(57) ABSTRACT

A computer-implemented method for facilitating one or more users virtually participating in a racing event, the method including: receiving, by one or more processors, a data feed from the event; processing, by the one or more processors, the data feed to generate a multi-dimensional virtual environment which substantially replicates the physical environment of the event, the multi-dimensional virtual environment including: virtualized representations of each participant in the event, wherein each of the virtualized representations of the participants is adapted to move inside the multi-dimensional virtual environment according to physical movements of the corresponding participant during the event, and one or more avatars corresponding with the one or more users, communicating, by the one or more processors, with computer hardware associated with the one or more users to: enable a display associated with the computer hardware to present, from a viewpoint associated with the user's avatar, the multi-dimensional virtual environment to the user, including the virtualized representations
(Continued)

and any movement of the virtualized representations, thereby enabling the user to visualise the racing event as time passes, and enable, based on user instructions, the user's avatar to navigate the race path, thereby enabling the user to participate in the racing event and compete against the participants.

18 Claims, 5 Drawing Sheets

(51) Int. Cl.
*A63F 13/65* (2014.01)
*G06T 19/00* (2011.01)

(58) Field of Classification Search
CPC ..... G06T 19/006; G06T 19/003; G06F 3/011; G06F 3/0482; G06F 3/04842
See application file for complete search history.

(56) References Cited

U.S. PATENT DOCUMENTS

| | | | |
|---|---|---|---|
| 8,730,156 B2* | 5/2014 | Weising | G06F 3/0304 348/47 |
| 9,457,229 B2 | 10/2016 | Liang et al. | |
| 2009/0054126 A1 | 2/2009 | Saito | |
| 2009/0262194 A1 | 10/2009 | Wakefield et al. | |
| 2011/0216060 A1 | 9/2011 | Weising et al. | |
| 2018/0104580 A1 | 4/2018 | Humadi | |
| 2019/0255441 A1 | 8/2019 | Trice | |
| 2019/0354099 A1* | 11/2019 | Shomin | G05D 1/0022 |
| 2020/0171386 A1 | 6/2020 | Buxton, II et al. | |
| 2022/0379221 A1* | 12/2022 | Yang | A63F 13/812 |

OTHER PUBLICATIONS

International Search Report for corresponding International Application No. PCT/AU2022/050449 mailed Jul. 8, 2022.
Written Opinion for corresponding International Application No. PCT/AU2022/050449 dated Jul. 8, 2022.
International Preliminary Report on Patentability for corresponding International Application No. PCT/AU2022/050449 dated Nov. 29, 2022.
Office Action dated Aug. 26, 2024 for corresponding Saudi Arabian Application No. 523451462 and English translation.
Search Report dated Nov. 13, 2025 for corresponding Singapore Application No. 11202308519V.
Written Opinion dated Nov. 13, 2025 for corresponding Singapore Application No. 11202308519V.

* cited by examiner

SYSTEM AND METHOD FOR FACILITATING VIRTUAL PARTICIPATION IN A RACING EVENT

CROSS-REFERENCE TO RELATED APPLICATIONS

This application is a national stage entry of International Application No. PCT/AU2022/050449 filed on May 12, 2022, which claims the benefit of priority to Australian Application No. 2021901407, filed May 12, 2021, the entire disclosures of which are hereby incorporated herein by reference.

FIELD OF THE INVENTION

The present invention relates to a computer-implemented system and method for facilitating virtual participation in a racing event. In particular, the present invention provides a multi-dimensional virtual environment that replicates a physical environment associated with a live, previously recorded or historical, racing event, wherein one or more users may virtually participate in the event using a gaming apparatus that enables the user to control movement of an avatar in the virtual environment.

BACKGROUND OF THE INVENTION

The manner by which users are able to view and interact with other users in activities involving network-connected electronic devices continues to evolve. For example, most gaming consoles are configured to enable connection to a network and hence enable users to enjoy an immersive online experience through use of their gaming console and an associated two dimensional display, such as a wide screen television. Such activities are no longer considered to be limited by the amount of memory that discs or gaming consoles embody, and in this regard cloud computing is a popular configuration since it enables online systems to avail themselves of the benefits of access to large amounts of memory and streaming images directly to a user's screen through a data communications network such as the Internet.

Bandwidth permitting, users can also enjoy fully immersive online experiences through the use of devices such as Virtual Reality (VR) headset displays, which can be stand-alone units or associated with a gaming console. Such headsets typically include displays that enable a user to immerse themselves in a representation of three dimensional virtual reality environment. Depending upon the application, the virtual reality environment can be created to replicate an actual physical space. The headset locates the user in the virtual environment and the user can typically control the movements and interactions of an avatar (i.e. an icon or figure representing themselves) inside the environment by interacting with the headset. For example, user instructions to an avatar may be registered by the headset through movements of the user's head (e.g. to look around in the virtual environment), movements of the user's body (e.g. to move around in the virtual environment), use of one or more buttons/touchpads associated with the headset or an associated controller, or by voice command.

One particular area in which evolving technology is prevalent is the sports industry where sports events and tournaments, such as racing events, are broadcast live to user devices, and users can interact by various means. For example, users can communicate with other users in relation to the broadcast racing event including using call/text messaging functionality associated with their mobile devices or social media to engage in discussion regarding an event or engage in activities such as online tipping and betting, etc.

However, despite the interest in virtual reality gaming and sporting events, users are unable to simulate their own participation in a live, previously recorded, or historical sporting event such as may virtually experience competing in the event against actual participants (e.g. sports men and women).

The present invention seeks to provide a system and method that addresses the lack of a user's ability to compete virtually in a sporting event such as a competitive race whilst also accommodating any luck regarding available resources whilst competing virtually in an event.

The reference to any prior art in this specification is not, and should not be taken as an acknowledgement, or any suggestion that, the prior art forms part of the common general knowledge.

SUMMARY OF THE INVENTION

According to one aspect, the present invention provides a computer-implemented method for facilitating one or more users virtually participating in a real-world racing event, the method including receiving, by one or more processors, a data feed from the event, wherein the data feed is from a live racing event, a pre-recorded racing event or a historical racing event, processing, by the one or more processors, the data feed to generate a multi-dimensional virtual environment which substantially replicates the physical environment of the event, the multi-dimensional virtual environment including virtualized representations of each participant in the event, wherein each of the virtualized representations of the participants is adapted to move inside the multi-dimensional virtual environment according to physical movements of the corresponding participant during the event, and one or more avatars corresponding with the one or more users, communicating, by the one or more processors, with computer hardware associated with the one or more users to enable a display associated with the computer hardware to present, from a viewpoint associated with the user's avatar, the multi-dimensional virtual environment to the user, including the virtualized representations and any movement of the virtualized representations, thereby enabling the user to visualise the racing event as time passes, and enable, based on user instructions, the user's avatar to navigate the race path, thereby enabling the user to participate in the racing event and compete against the participants.

In an embodiment, the method further includes receiving, by the one or more processors, feedback from the computer hardware including data relating to performance of one or more users who virtually participate in the racing event.

In embodiments, the multi-dimensional virtual environment is either a three dimensional or two dimensional representation of the physical environment of the racing event.

In an embodiment, the multi-dimensional virtual environment that substantially simulates the physical environment of the racing event may be modifiable to simulate any defined environmental and/or physical conditions, for example, rain, snow or windy/gale conditions. In this embodiment, the virtual environment may include changes to a pre-defined virtual environment of an event that is conducted annually with changes representing the physical location of objects for a particular event (e.g. audience seating, advertising signs etc).

It will be appreciated that the multi-dimensional virtual environment may include any racing surface, including, but not limited to, a race track, an animal race track, automobile race track, dirt road, sports court/arena, marathon track, rally (race car) track, ski/snow field or a body of water.

In an embodiment, the multi-dimensional virtual environment may further include virtual equipment that is/are modifiable in part, or whole, according to user input prior to, and/or during, the racing event.

The equipment may include any items used as part of the racing event. For example, the equipment may include a racing automobile which is modifiable with respect to one or more aspects of the racing automobile and potentially, the outcome of the racing event. In this example, assuming the racing event is based on a particular Grand Prix (historical) racing event in which it is known/recorded that the weather changed from dry to wet weather conditions during the race and this environmental change is simulated during the virtual racing event, the one or more users may elect to change the tyres of their racing automobile from "slick" tyres (i.e., tyres that do not have any grooves or patterns on them and thereby provide better traction under dry weather conditions) to treaded tyres (which provide better traction under wet conditions) during the racing event to thereby increase their prospects of winning the race. It will be appreciated that in this embodiment, the racing event is based on an actual historical Grand Prix race events, and the data feed will be based upon historical/recorded data regarding the environmental conditions as they existed on the day of the historical Grand Prix event.

According to another aspect, the present invention provides a system for facilitating one or more users in virtually participating in a real-world racing event, the system including computer hardware associated with each user, and one or more processors in communication with the computer hardware, the one or more processors configured to receive a data feed from the racing event, wherein the data feed is from a live racing event, a pre-recorded racing event or a historical racing event, and process same to generate a multi-dimensional virtual environment which substantially replicates the physical environment associated with the event, the multi-dimensional virtual environment including virtualized representations of each participant in the event, wherein each of the virtualized representations of the participants is adapted to move inside the multi-dimensional virtual environment according to physical movements of the corresponding participant along a race path during the event, and one or more avatars corresponding with the one or more users, communicating with computer hardware associated with the one or more users to enable a display associated with the computer hardware to present, from a viewpoint of the user's avatar, the multi-dimensional virtual environment to the user, including the virtualized representations and any movement of the virtualized representations, thereby enabling the user to visualise the racing event as time passes, and enable, based on user instructions, the user's avatar to navigate the race path, thereby enabling the user to participate in the racing event and compete against the participants.

According to a yet further aspect, the present invention provides a computer-readable medium storing instructions for facilitating one or more users in virtually participating in a real-world racing event, the instructions including one or more instructions that, when executed by one or more processors, cause the one or more processors to receive a data feed from a racing event, wherein the data feed is from a live racing event, a pre-recorded racing event or a historical racing event, process the data feed to generate a multi-dimensional virtual environment which substantially replicates the physical environment associated with the racing event, the multi-dimensional virtual environment including virtualized representations of each participant in the event, wherein each of the virtualized representations of the participants is adapted to move inside the multi-dimensional virtual environment according to physical movement of the corresponding participant along a race path during the event, and one or more avatars corresponding with the one or more users, communicating with computer hardware associated with the one or more users to enable a display associated with the computer hardware to present, from a viewpoint of the user's avatar, the multi-dimensional virtual environment to the user, including the virtualized representations and any movement of the virtualized representations, thereby enabling the user to visualise the racing event as time passes, and enable, based on user instructions, the user's avatar to navigate the race path, thereby enabling the user to participate in the racing event and compete against the participants.

To generate the most realistic experience, it is preferable to generate a three dimensional environment in which users may immerse themselves. However, there may be circumstances, including limited bandwidth availability during a virtual participation in an event, which necessitates a user receiving a two dimensional representation of the physical environment and thereby participating in the event with a two dimensional representation of the event and the participants. In an embodiment, different users may participate in the same racing event with either a two or three dimensional virtual representation of the physical environment of the racing event and the two or three dimensional representation may be provided to individual participants of different times and for different periods depending upon the bandwidth availability for individual participants according to their location. In one particular embodiment, individual participants may select the virtual representation provided to them at any time such that individual participant may determine for themselves when a three dimensional representation is downgraded to a two dimensional representation to retain user interaction without interruptions/delays that may otherwise occur in the event network bandwidth is temporarily compromised and data buffering occurs.

BRIEF DESCRIPTION OF THE DRAWINGS

Embodiments of the invention are described in further detail with reference to the accompanying Figures in which the event is a racing event and the physical environment and objects therein are generated and represented in three dimensions. In this regard.

DETAILED DESCRIPTION OF EMBODIMENT(S) OF THE INVENTION

Figure 1:
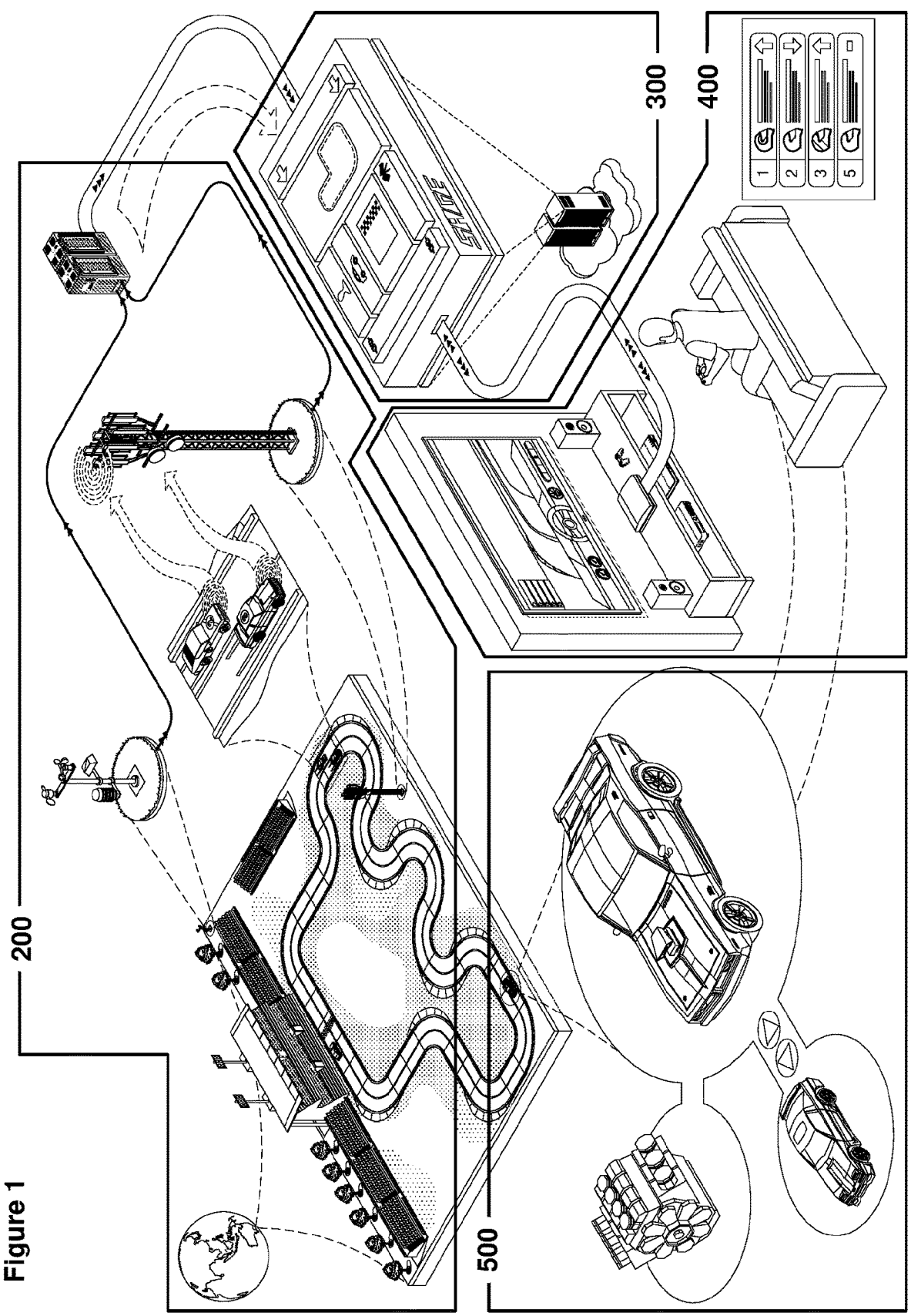
FIG. 1 illustrates an overview of the system and method for facilitating virtual participation in a live racing event according to an embodiment of the present invention.

The present invention relates to a computer-implemented system and method for facilitating one or more users (190) in virtually participating in a racing event (10). In an embodiment, central server (100) receives a data feed (80) from the event (10) and processes same to generate either a two or three-dimensional virtual environment (220) which substantially replicates the physical environment associated with the event (10). In the embodiments described herein, the event (10) is a motor racing event involving a particular motor racing track (20) although the event may be any other live (or pre-recorded or historical) racing event. The virtual environment (220) will include virtualised representations (not shown) corresponding to each of the actual race participants (40A, 40B), wherein each of the virtualised representations corresponding to the participants (40A, 40B) is adapted to move inside the two or three-dimensional virtual environment (220) in accordance with physical movement of the participants (40A, 40B) along a race path (20) associated with the event. The virtual environment (220) further includes avatars (250, 260) that correspond with the one or more users (190) which are controlled by the one or more users (190).

The central server (100) is configured to communicate with computer hardware (210) at the user-end, which in the embodiment shown is a gaming console. This enables the computer hardware (210) to cause an associated display to present, from a viewpoint associated with the user's avatar, the two or three-dimensional virtual environment (220) including the virtualised representations (e.g. participants) and any movement thereof (e.g. movement of the virtual participants along the race path). In this way, the one or more users (190) are able to visualise, in real-time or near real-time, the live racing event (10) replicating the users (190) presence at the event (10) alongside the actual participants (40A, 40B). Further, based on instructions by the user (190) input into the computer hardware (210), using controller (230) for example, the user (190) may control his or her own avatar as an additional participant in the event. In other words, the user (190) is able to navigate a virtual replica of the racetrack (20) alongside the actual participants represented as avatars thereby virtually initiating the user (190) participating in the racing event (10) and competing against the original participants (40A, 40B).

Accordingly, as shown by way of example in FIG. 1, the system and method of the present invention provides a solution that enable users (190) to view a virtual representation (220) of a live racing event (10) and compete in the racing event from the comfort of their living room anywhere in the world. The live racing event may involve any racing sport such as, for example, motor racing, motorbike racing, horse racing or any other racing event in respect of which data may be captured in real-time or near real-time.

The skilled addressee will appreciate that in order to replicate a racing event, the server (100) will require access to data relating to the race path, e.g. racetrack (20). In this regard, racetrack data may either be pre-programed into server (100), on the basis that such tracks typically do not change and are used frequently for racing events (e.g. the Monaco Formula 1 street circuit, or the Flemington horseracing track in Victoria, Australia). Such race path data may be stored by the server (100) so that details relating to the race track do not need to be monitored and supplied to the server during each race, which will result in a reduction in processor and memory consumption.

Alternatively, if race track data is unknown and/or not accessible, visual representations that correspond with an object associated with the track (e.g. rails or safety barriers) may be detected in real-time during an event such that the track also appears in the virtual environment in real-time as such data is collected. As will become apparent, additional data may be collected during a live event (10) including, for example, environmental data such as rain, visibility, wind speed, temperature and humidity, and telemetric data such as a position of a participant on the track, speed, acceleration and lap times in order to provide the user with as immersive an experience as possible. In one embodiment, the visual representation of the racetrack is altered to replace existing or historical advertising indicia with selected advertising indicia according to the programming of the system. In this embodiment, the selected advertising indicia to replace the existing/historical indicia may vary according to the geographic location of participants such that they are exposed to advertising indicia relevant to goods and/or services available to the consuming public in the geolocation of each participant. Of course, affording businesses the opportunity to replace existing/historical advertising indicia with their own brands/logos in respect of instances of virtual events/virtual participation using pre-stored racetracks, represents a commercial opportunity for which the operator of the system may derive revenue.

It will also be appreciated that replication of a historical or pre-recorded racing event (rather than a live event), will also include pre-programming of a server regarding any known/recorded environmental conditions associated with the particular historical or pre-recorded racing event. Further, historical data pertaining to actual events that occurred during a historical race may be stored and accessed to generate avatars of actual historical race participants against whom a user may compete.

Figure 2:
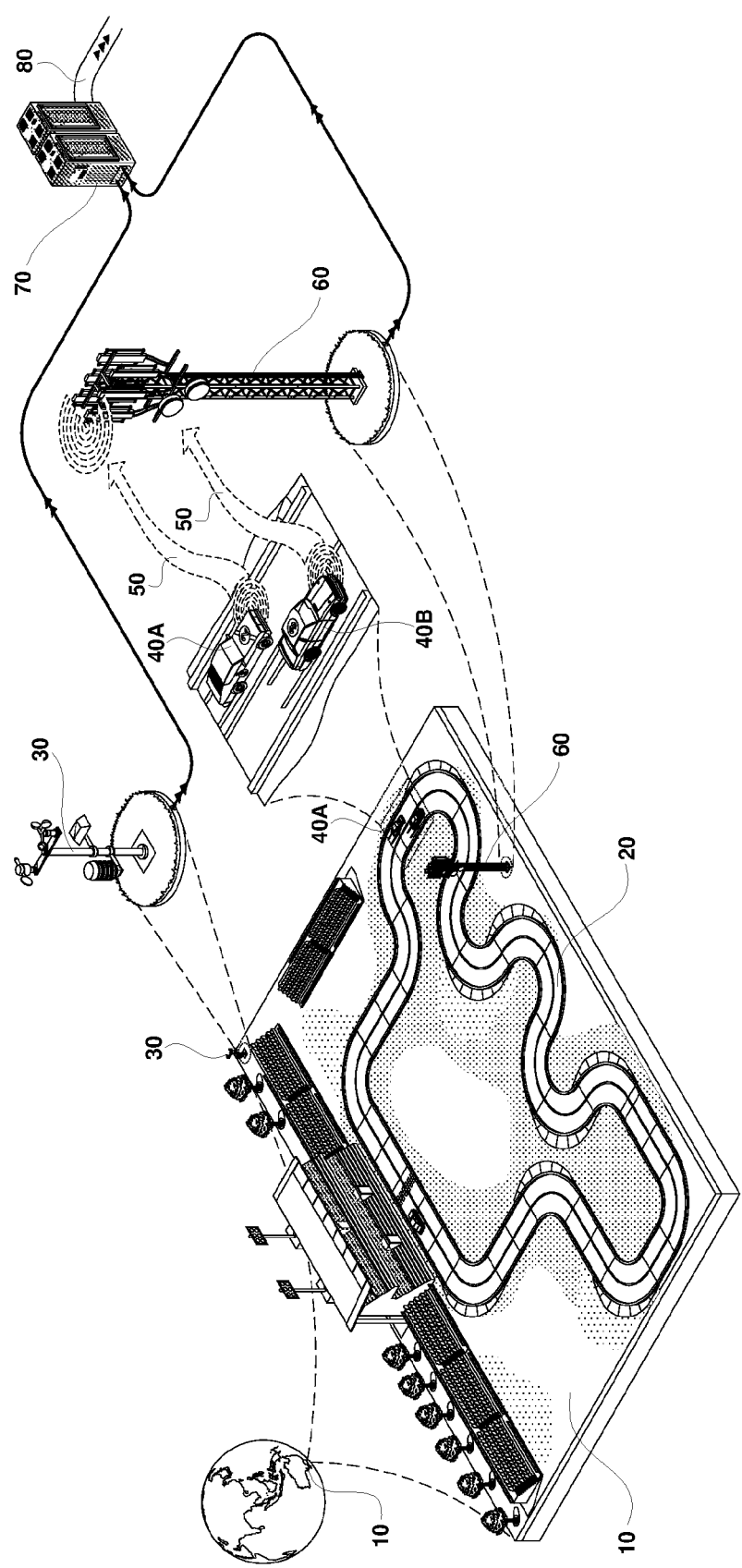
FIG. 2 illustrates a perspective view of an example live racing event and the capture of live feed data according to the embodiment depicted in FIG. 1.
Figure 3:
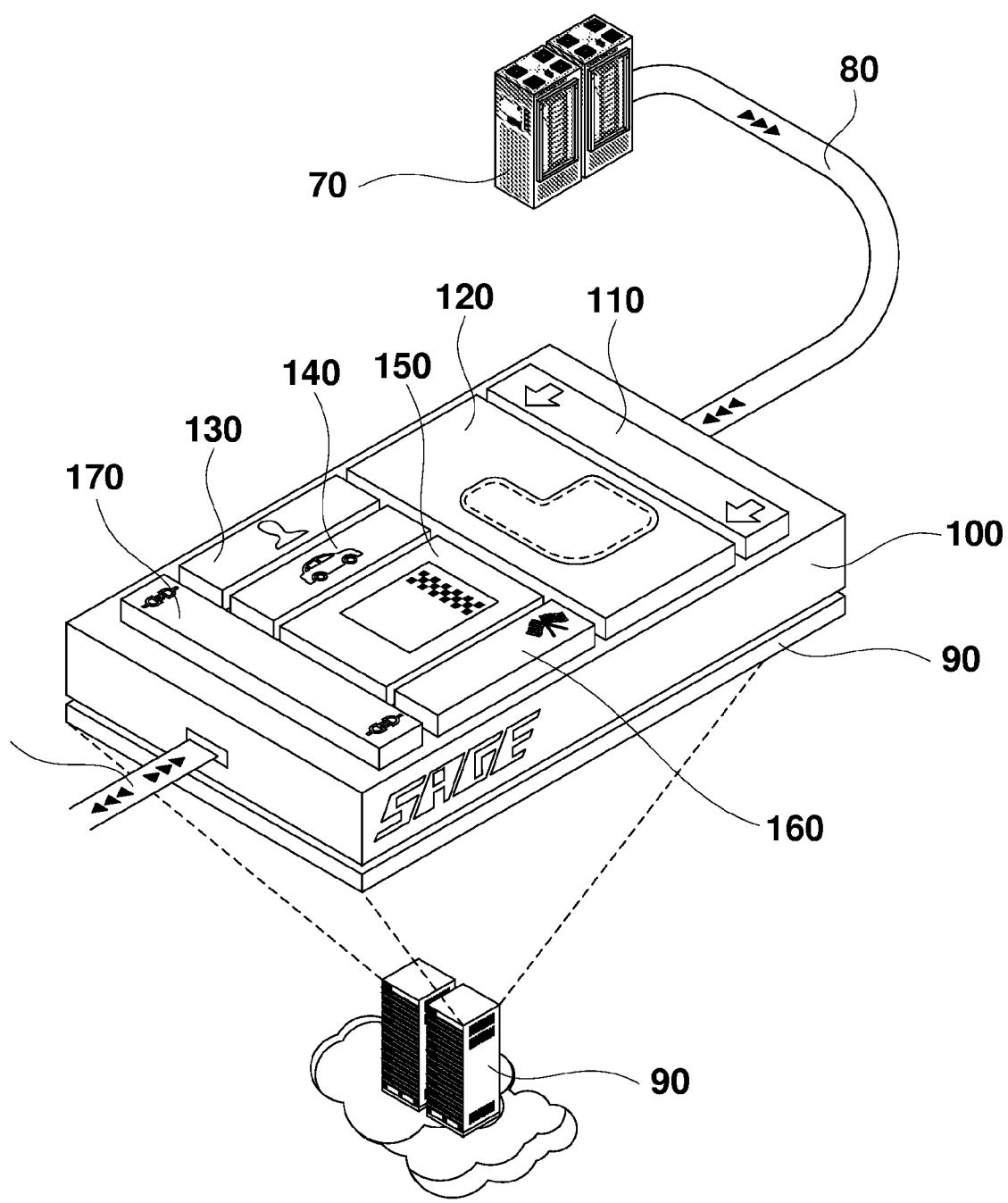
FIG. 3 illustrates a server component of the embodiment of FIG. 1.
Figure 4:
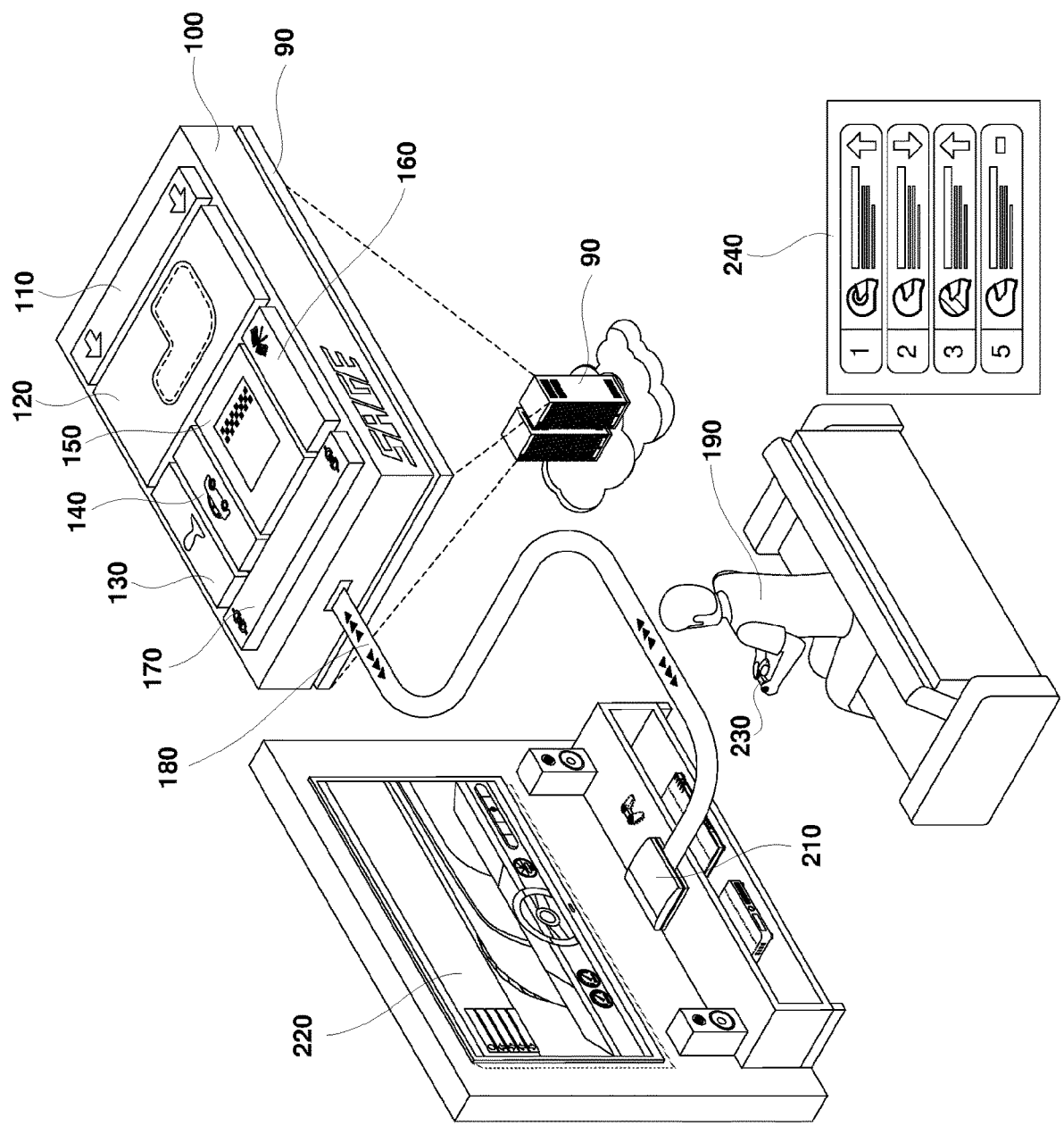
FIG. 4 illustrates an exemplary flow diagram of a process that enables a user to view the two or three-dimensional virtual environment using computer hardware in operable communication with the server depicted in FIG. 3.

FIG. 1 is divided into segments which are further expanded in the subsequent FIGS. 2 to 4. In FIG. 1, segments (200) and (300) show the server (100) in communication with environmental data capture hardware (30) and telemetric data receiver hardware (60) located at the sporting event (10). Such hardware enables a live data feed to be transmitted to an event data collection server (70), and in turn to the server (100), as further expanded in FIG. 3. Also detailed in FIG. 1 is Segment (400), which is further detailed in FIG. 4 and shows a user (190) sitting in their lounge room and viewing a two-dimensional version of the virtual environment (220) on a display screen associated with a gaming console (210). Finally, segment (500) of FIG. 1 is further detailed in FIG. 5 and depicts some of the options available to a user prior to participating in the virtual event including for example selecting a particular avatar which, in the example shown, is a vehicle (250, 260). The paragraphs that follow elaborate further upon the detail in each of FIGS. 2-5.

As mentioned above, FIG. 2 shows an example of a live racing event (10) and how data (80) from the event (10) may be captured and used to recreate the virtual race. Shown in FIG. 2 is a racetrack (20) and two participants (40A, 40B) in the form of race car drivers competing against one another. The movement of the vehicles may be captured using motion capture technology. For example, one or more sensors may be placed on each vehicle and may transmit data to a telemetric data receiver (60) which will receive the data in real-time. Other motion capture technologies may be used that do not require vehicle-mounted sensors to transmit data. For example, the vehicles may be fitted with reflective markers that reflect or emit light that is subsequently tracked by cameras to thereby track movement of the vehicles. In this way, telemetric data may be captured for each vehicle and may include data relating to the position of each participant on the track, the speed at which the vehicle is travelling, acceleration of the vehicle, and lap times. It will be appreciated that the data collected and method of collection may vary depending on the racing event for which a virtual representation is sought.

Once collected, the telemetric data receivers (60) may transmit data to an event data collection server (70) which is also present at the live event (10).

In addition to telemetric data, environmental data may also be captured by one or more environmental capture devices (30). This enables the conditions experienced by the participants, including rain, visibility, wind speed, temperature and humidity, to be captured so that similar conditions may be reflected in the virtual environment. This is to ensure the virtual race conforms with the conditions of the live event as closely as possible. Such data may also be transmitted by the environmental data capture devices (30) to the event data collection server (70) which is responsible for collating all data received from the event and transmitting same, in real-time or near real-time, to the server (100).

In an alternate embodiment, one or more of the environmental factors may be received or accessed from other sources such as from available meteorological information.

FIG. 3 shows the server component which accepts the data feed (80) from the event data collection server (70) and processes same to generate the two or three-dimensional virtual environment (220). It will be appreciated in FIG. 3 that the server (100) includes infrastructure (90), which may be a local or cloud-based infrastructure. The main purpose of server (100) receives the data feed (80) from the event (10) and subsequently process same to generate the virtual environment (220), which will replicate the racing event including racing conditions and competitors. Through a game console (210), virtual reality headset (not shown), computer, or any device capable of displaying a two or three-dimensional environment, users (190) are able to compete in the virtual race against a virtual representation of the actual participants (e.g. professional sports people).

The central server (100) may operate computer applications that provide at least functions (110, 120, 130, 140, 150 and 160) described herein, which respectively include:

Data processing (110) i.e. collecting and processing the event data feed (80) into a format suitable for storage and the generation (120) of the virtual environment (220);

Functionality (120) for generating a two or three-dimensional model replicating the racing event (10) at any point in time based upon the event data (80) that has been collected and processed;

User account register (130) which provides a register of users (190) utilising the system as well as their preferences and settings;

Repository (140) of graphical images that a user may select to appear as their own avatar when the virtual race is rendered (150) and which may be based upon the user preferences and settings (130);

Functionality (150) that renders the two or three-dimensional virtual environment (220) by taking the virtual environment model generated by functionality (120) and creating the image(s) displayed using the computer apparatus (210). This functionality takes the virtual race model that has been generated and creates the images that the user (190) sees when operating their gaming console or similar device, and the created environment will replicate the live event based upon the data received in the data feed (80) including telemetric and/or environmental data. The image(s) created may be based on additional factors including a viewing position of the user (190) and user preferences such as a selection of particular graphical images for virtualised representations and avatars;

Functionality (160) that generates results and meter boards for display on a graphical user interface, such display showing performance-related details associated with each of the original competitors (40A, 40B) as well as the one or more users (190).

Accordingly, a real-time or near real-time feed (80) of event data is transferred from hardware (70) to the server (100) to provide position and movement as well as additional telemetric data relating to participants, environmental conditions and any additional objects that are required to be captured in the live racing event (10). This enables generation of a two or three-dimensional virtual environment (220). Additional object data that may require monitoring includes, but is not limited to, racetrack-related objects to enable replication of the track (20).

The present invention is not intended to be limited to any particular type of sensor or motion capture device. The selection of sensors, markers or any other device for use in capturing data may ultimately be dependent upon the racing event being replicated. Generally, there will need to be a capture of least position and movement data associated with the participants (40A, 40B).

FIG. 4 shows a user (190) sitting in their lounge room viewing a two-dimensional virtual environment (220) displayed on a screen which is connected to their gaming console (210). It will be understood that any appropriate viewing hardware may be utilised, including for example a virtual reality headset (not shown) which would enable the user (190) to visualise a three-dimensional virtual environment instead of a two-dimensional environment. In the embodiment shown, instructions for moving the user avatar through the race are transferred to the console via controller (230).

Also shown in FIG. 4 is a client connection (180) which reflects communication of data from the sever (100) to the gaming console (210) at the user end, and vice versa. Communication between the gaming console (210) and the server (100) may be achieved via an internet or similar network connection. It will also be further understood that rendering of a two or three-dimensional virtual environment (220) may be achieved at the server side, as described above, or may be achieved at the client side, e.g. by gaming console (210), or a combination of both.

FIG. 4 illustrates an enlarged view of each of the game console (210) with associated display, and game controller (230). As mentioned previously, the game console (210) will take input (instructions) from the controller (230), which is controlled by user (190), and will display the rendered environment (220) to the user (190) from a particular perspective associated with the user's avatar. In the embodiment shown in FIG. 4, this perspective is a first-person perspective wherein the game displays what the player's avatar would see with the avatar's own eyes. However, the environment may be rendered such that the perspective is different, e.g. from a third-person perspective in which the user can visualise his own avatar and control same.

The perspective, including whether the display is a first or third person perspective, may be one of the preferences that is selectable by the user (190) prior to, or during, participation in the virtual race. Input into the controller (230) translates into different actions on behalf of the user's avatar in the virtual environment (220) and may include, for example, steering, acceleration, braking and any additional actions that may be required to properly participate in the particular racing event.

The invention is not intended to be limited to the use of a gaming console controller to control movement of the user's avatar. For example, other devices such as race simulator cockpits may be used. The display associated with the hardware (210) may be any suitable display for presenting two or three-dimensional images to the user (190) including for example a TV, headset, computer monitor or any other projector that is capable of displaying the rendered event (220) to the user (190).

FIG. 4 further illustrates an interface (240) that may be used to display any race related information at any time during and/or subsequent to the completion of a racing event. For example, the display (240) may be in the form of a leaderboard which displays the results of the race in real-time, including for example a listing of the race leaders. In this way, users (190) are able to compare their performance against the participants (40A, 40B) not only after a race but also during, as well as against, any other users who may be participating in the same event from an alternate location.

The users (190) may enjoy control over various additional parameters and options associated with the virtual environment, including but not limited to the ability to select (270) alternate avatars. For example, alternate vehicles (260) may be displayed and the user may select an avatar (250) that is preferred for use during any one racing event. The vehicle specifications and performance may realistically match that of the live participants (40A, 40B), and the performance of the selected vehicle may also be affected by the conditions and other random events such as safety cars and failures, similar to conditions in random events that are likely to be experienced by the actual participants (40A, 40B) in the live event.

Figure 5:
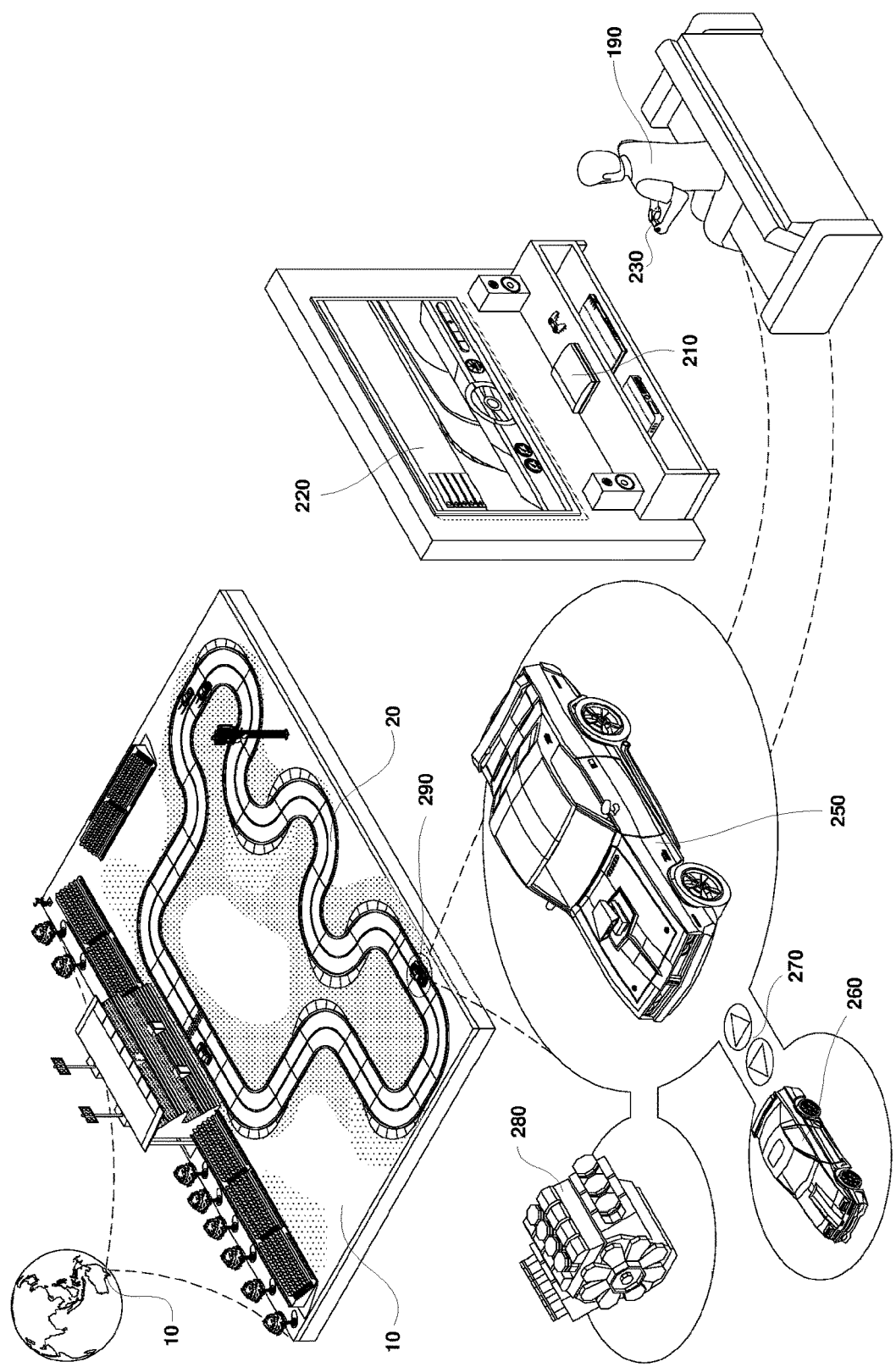
FIG. 5 illustrates an exemplary flow diagram of a process that enables the user depicted in FIG. 4 to select and make modifications to a particular avatar for use in the two or three-dimensional virtual environment.

Users may also have the ability to build or make modifications to their selected avatar (vehicle) to suit particular conditions (for example the use of wet weather tyres) or to make general performance improvements, e.g. upgrading the vehicle engine (80), as shown in FIG. 5. In some implementations, the user may be requested to pay for such builds/modifications with money or game credits.

FIG. 5 shows the user's avatar (290) in the form of a race vehicle positioned on the racetrack (20) during a race event in which the user is competing against virtual representations of the live participants (40A, 40B) as well as any other users who are participating. The users (190) will participate in the virtual race under the same or similar conditions as the live event from the comfort of their lounge room.

Additional data may be monitored and stored (and retrieved by the user at any time) to allow the user to track how they are progressing not only during a race but in relation to their overall performance improvement at a particular race track or in relation to a particular sport over a period of time (e.g. weeks, months, or years). In addition to rewarding the user or participant that finishes first in a leading position, there may be other achievements that are monitored and acknowledged/rewarded including, for example, personal best lap times. It is to be understood that the users (190) can join communities and leader boards to compete against other users in relation to such achievements. In this way, users are able to compare their results with others and enjoy friendly rivalry, as well as engage in additional online interactions such as trading or selling their avatars (vehicles) to other users for money of game credits.

It is to be understood that the event need not necessarily be a live event and could for example be a pre-recorded or historical event. Such events may also be rendered into the virtual environment, and the benefit of such events is that data associated with the event such as telemetric data, environmental data, etc, are all known and hence do not need to be recorded in real-time. For example, a user may prefer to race in a particular Formula 1 Grand Prix race that was attended by the user in order to test their capabilities against past sportspeople who have retired or passed away. In this regard, the server (100) may store, or have access to, requisite data corresponding to the particular race which is capable of being rendered into a virtual environment.

The events may also be configured to assign advantage (e.g. through avatar selection, acceleration capacity of the vehicle, scoring compensation, or other advantage) to different users to ensure fairness with respect to other users and/or the actual participants. For example, the avatars (e.g. vehicles in the case of motor sports, horses in the case of horse racing, etc) that are made available for selection may have attributes that exceed those of the actual participants to provide users with increased capacity to compete against professional race participants.

Additional parameters that a user may be requested to input, which may also have an effect on the available avatars presented to the user for selection, include the user's height, weight, stamina and additional fitness parameters. In this regard, an artificial intelligence technique may be utilised once all telemetric, environmental and user data have been collated and processed in order to adjust the avatars that are presented as available options to the user, as well as to adjust other settings including allocated handicaps as mentioned above. As a further alternative, each user may be requested to select a difficulty level, e.g. low, medium or high, and particular races and/or particular participants and/or particular users may be selected on the basis of that selection in addition to other user preferences.

A user may also be requested to input additional parameters relating to the racing equipment prior to, or during, the course of a racing event. For example, a user may be requested to input the make, year and/or model of their racing automobile and other aspects relating to control and configuration of the racing automobile prior to, and/or during, the race. Alternatively, a user may be presented with a range of selectable options. In this regard, the user may also be able to select when (or how often) their racing automobile is re-fuelled/serviced during the race (commonly referred to as a "pit-stop") and may also input data, substantially in real-time during the course of the race, relating to particular aspects of their vehicle. As an example, a user may prefer to initiate a change in tyre type during the race (for example, from slick to treaded tyres in the event of rain), to accommodate an altered racetrack from a dry to wet condition. In one embodiment, the user's choices regarding selections are recorded and may be used to generate a targeted advertising profile for each user. In the embodiment in which advertising indicia in a virtual representation of a racetrack is selected according to each user, the user's targeted advertising profile may be analysed to determine appropriate replacement advertising indicia that are highly relevant to the individual user.

It will be appreciated that a user's avatar may come into contact with the virtual representation of a competing vehicle during a race. This circumstance could be accommodated, for example, by allowing both the user and participant to continue racing as though the vehicles did not make contact and are invisible to each other. This will ensure that the representation of the live participant in the virtual environment continues moving in accordance with the participants movement during the live racing event. Alternatively, such contact may cause the movement and/or position of one or both of the user vehicle and live participant vehicle to be affected by the contact. In this regard, the server and/or console may override the data feed associated with the live participant and cause movement of the participant in the virtual environment to cease or become automated (i.e. no longer reflective of its movement in the live event). Depending upon the severity of the contact, one or both vehicles may be caused to retire from the racing event. In this regard, the user may select their preferred option prior to, or during, the racing event.

The server and/or gaming console (210) may have the ability to establish an API link with external gambling software platforms to enable wagers to be made in respect of user participation in the racing event.

The central server (100) may be a single computer, the partial computing resources of a single computer, a plurality of computers communicating with one another, or a network of remote servers (e.g., cloud). The one or more servers may house local databases and/or communicate with one or more external databases.

The viewing hardware (210) may communicate with the server (100) over a network. In some embodiments, the network may be a wide segment network ("WAN"), e.g., the Internet. In other embodiments, the network may be a local segment network ("LAN"). For example, in a more remote location far from a metropolitan segment, the Internet may not be available. In yet other embodiments, the network may be a combination of a WAN and a LAN.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word "comprise", and variations such as "comprises" and "comprising", will be understood to mean the inclusion of a stated feature or step, or group of features or steps, but not the exclusion of any other feature or step, or group of features or steps.

The invention claimed is:

1. A computer-implemented method for facilitating one or more users virtually participating in a real-world racing event, the method comprising:
   receiving, by one or more processors, a data feed from the real-world racing event, wherein the data feed is from a live racing event, a pre-recorded racing event or a historical racing event;
   processing, by the one or more processors, the data feed to generate a multi-dimensional virtual environment which substantially replicates the physical environment of the event,
      the multi-dimensional virtual environment comprising:
         virtualized representations of each participant in the event, wherein each of the virtualized representations of the participants is adapted to move inside the multi-dimensional virtual environment according to physical movements of the corresponding participant during the event, and
         one or more avatars corresponding with the one or more users,
   communicating, by the one or more processors, with computer hardware associated with the one or more users to:
      enable a display associated with the computer hardware to present, from a viewpoint associated with the user's avatar, the multi-dimensional virtual environment to the user, including the virtualized representations and any movement of the virtualized representations, thereby enabling the user to visualise the racing event as time passes, and
      enable, based on user instructions, the user's avatar to navigate the race path, thereby enabling the user to participate in the racing event and compete against the participants.

2. The method according to claim 1, further including receiving, by the one or more processors, data relating to performance of one or more users who virtually participate in the racing event.

3. The method according to claim 1, wherein the multi-dimensional virtual environment is either a three dimensional or two dimensional representation of the physical environment of the racing event.

4. The method according to claim 1, wherein the multi-dimensional virtual environment that substantially simulates the physical environment of the racing event is modifiable to simulate any defined environmental and/or physical conditions.

5. The method according to claim 1, wherein the multi-dimensional virtual environment further includes virtual equipment that is/are modifiable in part, or whole, according to user input entered prior to and/or during the racing event.

6. The method according to claim 1, wherein the multi-dimensional virtual environment includes a virtual racing landscape selected from any one or more of a race track, an animal race track, an automobile race track, a dirt road, a sports court/arena, a marathon track, a rally (race car) track, a ski/snow field or a body of water.

7. A system for facilitating one or more users in virtually participating in a real-world racing event, the system comprising computer hardware associated with each user, and one or more processors in communication with the computer hardware, the one or more processors configured to:
   receive a data feed from the real-world racing event and process same to generate a multi-dimensional virtual environment which substantially replicates the physical environment associated with the event wherein the data feed is from a live racing event, a pre-recorded racing event or a historical racing event,
      the multi-dimensional virtual environment comprising:
         virtualized representations of each participant in the event, wherein each of the virtualized representations of the participants is adapted to move inside the multi-dimensional virtual environment according to physical movements of the corresponding participant along a race path during the event, and
         one or more avatars corresponding with the one or more users,
   communicating with computer hardware associated with the one or more users to:
      enable a display associated with the computer hardware to present, from a viewpoint of the user's avatar, the multi-dimensional virtual environment to the user, including the virtualized representations and any movement of the virtualized representations, thereby enabling the user to visualise the racing event as time passes, and enable, based on user instructions, the user's avatar to navigate the race path, thereby enabling the user to participate in the racing event and compete against the participants.

8. The system according to claim 7, further including receiving, by the one or more processors, data relating to performance of one or more users who virtually participate in the racing event.

9. The system according to claim 7, wherein the multi-dimensional virtual environment is either a three dimensional or two dimensional representation of the physical environment of the racing event.

10. The system according to claim 7, wherein the multi-dimensional virtual environment that substantially simulates the physical environment of the racing event is modifiable to simulate any defined environmental and/or physical conditions.

11. The system according to claim 7, wherein the multi-dimensional virtual environment further includes virtual equipment that is/are modifiable in part, or whole, according to user input entered prior to, and/or during, the racing event.

12. The system according to claim 7, wherein the multi-dimensional virtual environment includes a racing surface selected from any one or more of a race track, an animal race track, an automobile race track, a dirt road, a sports court/arena, a marathon track, a rally (race car) track, a ski/snow field or a body of water.

13. A non-transitory computer-readable medium storing instructions for facilitating one or more users in virtually participating in a real-world racing event, the instructions comprising one or more computer instructions that, when executed by one or more processors, cause the one or more processors to:

receive a data feed from a real-world racing event, wherein the data feed is from a live racing event, a pre-recorded racing event or a historical racing event;

process the data feed to generate a multi-dimensional virtual environment which substantially replicates the physical environment associated with the racing event, the multi-dimensional virtual environment comprising:

virtualized representations of each participant in the event, wherein each of the virtualized representations of the participants is adapted to move inside the multi-dimensional virtual environment according to physical movement of the corresponding participant along a race path during the event, and one or more avatars corresponding with the one or more users;

communicating with computer hardware associated with the one or more users to:

enable a display associated with the computer hardware to present, from a viewpoint of the user's avatar, the multi-dimensional virtual environment to the user, including the virtualized representations and any movement of the virtualized representations, thereby enabling the user to visualise the racing event as time passes, and enable, based on user instructions, the user's avatar to navigate the race path, thereby enabling the user to participate in the racing event and compete against the participants.

14. The non-transitory computer-readable medium according to claim 13, wherein the computer instructions further comprise instructions that cause receiving, by the one or more processors, data relating to performance of one or more users who virtually participate in the racing event.

15. The non-transitory computer-readable medium according to claim 13, wherein the computer instructions comprise instructions that cause the one or more processes to present a multi-dimensional virtual environment is either a three dimensional or two dimensional representation of the physical environment of the racing event.

16. The non-transitory computer-readable medium according to claim 13, wherein the multi-dimensional virtual environment that substantially simulates the physical environment of the racing event is modifiable to simulate any defined environmental and/or physical conditions.

17. The non-transitory computer-readable medium according to claim 13, wherein the multi-dimensional virtual environment further comprises virtual equipment that is/are modifiable in part, or whole, according to user input entered prior to, and/or during, the racing event.

18. The non-transitory computer-readable medium according to claim 13, wherein the multi-dimensional virtual environment comprises a racing surface selected from any one or more of a race track, an animal race track, an automobile race track, a dirt road, a sports court/arena, a marathon track, a rally (race car) track, a ski/snow field or a body of water.

* * * * *